Nov. 25, 1958   F. G. WILLINGER   2,861,815
KNOCKDOWN MOTORCYCLE FRAME
Filed Nov. 19, 1956   2 Sheets-Sheet 2
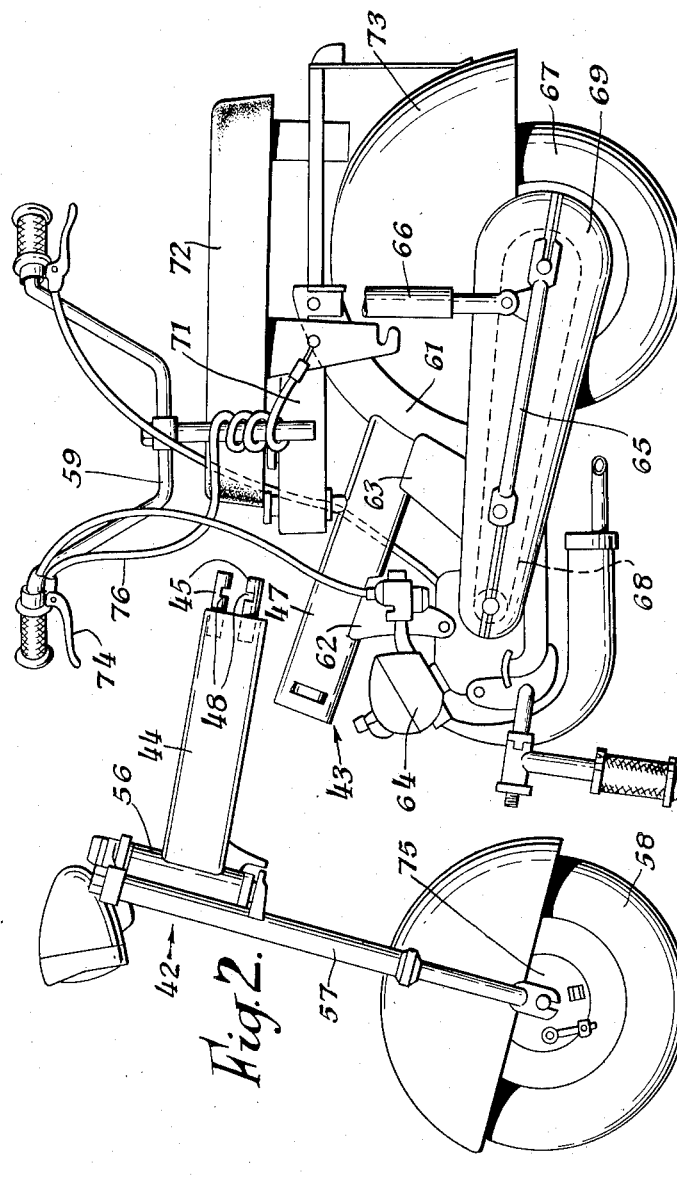
INVENTOR
FRANCIS G. WILLINGER
BY

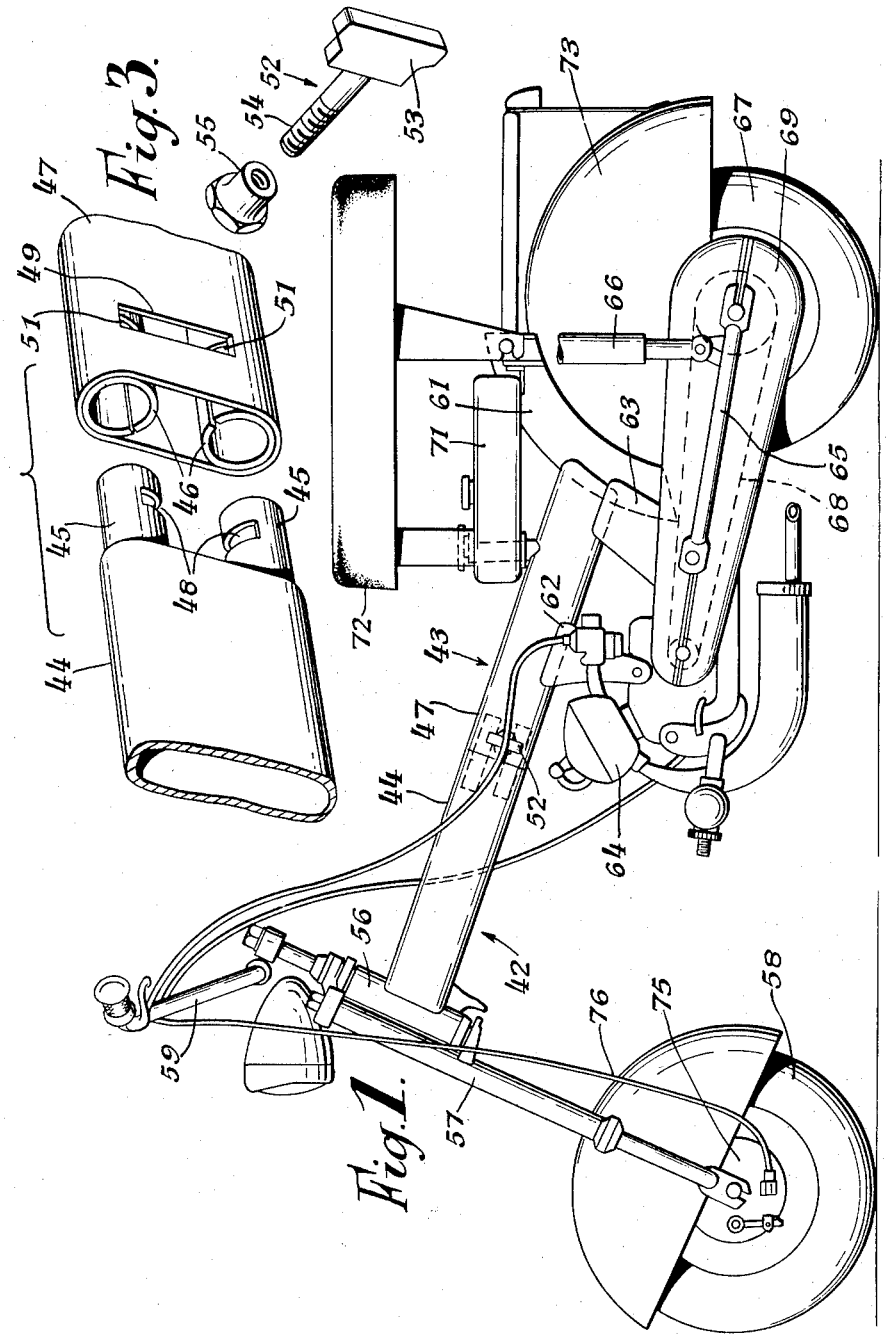

United States Patent Office 2,861,815
Patented Nov. 25, 1958

2,861,815
KNOCKDOWN MOTORCYCLE FRAME

Francis G. Willinger, London, England

Application November 19, 1956, Serial No. 623,176

Claims priority, application Great Britain November 28, 1955

1 Claim. (Cl. 280—278)

This invention relates to power driven vehicles of the bicycle type, such as motor cycles, motor scooters and mo-peds, and has for its object to provide an improved frame construction which enables such vehicles to be quickly separated into two parts for packing and transport, and re-assembled for use. The vehicle, when the parts are separated, can usually be accommodated in the luggage compartment of a car, or in a small aeroplane.

According to the invention, a frame for a power driven vehicle of the bicycle type comprises readily separable front and rear portions, the front portion including a head tube or equivalent for mounting a steerable front wheel and handlebars, the rear portion being adapted for the mounting thereon of an engine, a rear wheel and power transmission means, and readily releasable means for rigidly clamping said front and rear frame portions one to the other.

Further, according to the invention, a power driven vehicle of the bicycle type comprises a frame having readily separable front and rear portions, a front wheel mounting pivotally supported in the front frame portion, handlebars detachably connected to said front wheel mounting, an engine mounted on the rear frame portion, and driving a rear wheel also mounted on said rear frame portion through transmission means, controls for said engine and transmission means on said handlebars and readily releasable means for rigidly clamping said front and rear frame portions one to the other.

The front and rear portions of the frame may be provided respectively with interfitting spigot and socket members, means being provided to contract the sockets into gripping engagement with the spigots.

Alternatively, the front and rear portions of the frame may each include parts of one or more longitudinal frame members, the parts of each said frame member overlapping and being secured together by a transverse locking member.

The invention is hereinafter described with reference to the accompanying drawings, in which:

Figure 1 is a side elevation of a light motor cycle embodying a frame according to the invention;

Figure 2 is an elevation showing the parts of the motor cycle shown in Figure 1 separated from one another; and Figure 3 is a detail view showing the parts of the joint between the frame portions used in the motor cycle shown in Figures 1 and 2.

Referring to the drawings, the frame of a light motorcycle is shown as comprising a front portion 42 and a rear portion 43 each including one part of a single, straight backbone member consisting of a tube of flattened oval cross section, the part 44 of the said backbone member having fixed in it two cylindrical tubes 45 which project beyond the end of the said portion as shown, and are adapted to enter a pair of larger cylindrical tubes 46 fixed in the other part 47 of the backbone member. The tubes 45 are slotted as shown at 48, and the backbone part 47 and tubes 46 are also slotted as shown at 49 and 51 respectively, the slots 48 registering with the slots 49 and 51 when the parts are assembled to enable a locking member 52 to be passed through the slots. The locking member has a flat head 53 which enters the slots, and a screw-threaded stem 54 adapted to receive a nut 55 to hold the locking member in place.

The forward end of the part 44 of the backbone is fixed to a head tube 56 in which is mounted a front fork unit 57 of the telescopic type to receive a front wheel 58. Handlebars 59 are mounted in the front fork unit.

The rear end of the part 47 in the backbone is fixed to an arcuate frame member 61, and the said part 47 has fixed to it pairs of brackets, one of each pair being shown at 62 and 63 respectively. An engine 64 is supported by these brackets, and a pair of rear forks 65, pivoted to the brackets 63, are supported by telescopic spring members 66 the upper ends of which are pivotally coupled to the top of the frame member 61. The engine 64 drives a rear wheel 67 mounted in the forks 65 through a roller chain 68 enclosed in a chain case 69.

A fuel tank 71 is mounted, as shown, above the rear part 47 of the backbone, and a saddle 72 is detachably mounted above the fuel tank. A fairing 73 covers the rear wheel 67.

Figure 1 shows the vehicle in its assembled condition, whilst Figure 2 shows the parts separated for storage or transport. It will be seen that the handlebars 59 with the engine and transmission controls attached to them, are removed from the front fork unit, the saddle 72 is reversed and set in a lower position, and the front portion of the frame is separated from the rear portion by removing the locking member 52. The handlebar carries a front brake lever 74 (Figure 2) adapted to operate a front brake 75 through a cable 76 which is disconnected from the brake before the handlebars 59 are separated from the front fork unit.

It will be readily seen that the separation of the frame of the vehicle into two parts materially assists the packing of the vehicle into a confined space. Whilst the invention has been particularly described with reference to light motor-cycles, it is also applicable to motor scooters and mo-peds.

The invention is not limited to the particular arrangements described for securing together the front and rear portions of the frame. A single backbone member such as is shown may have the mating ends of its parts overlapping and secured together by transverse bolts or the like. The mating ends of the parts may be cut obliquely to provide the overlap.

I claim:

A frame for a two wheeled vehicle of the bicycle or motorcycle type, comprising readily separable front and rear portions, the front portion including a head tube for mounting a steerable front wheel and handlebars, the rear portion including means for mounting a rear wheel and seat, said front and rear portions of the frame each including a part of a single longitudinal member of flattened oval cross-section, one of said parts having a pair of spaced projections adapted to enter the end of the other part and the other part being slotted transversely, said spaced projections comprising tubes each provided with a transverse notch facing each other, the end of said other part including longitudinally slotted tubes to receive the projecting tubes, said longitudinally slotted tubes having transverse slots in alignment with the slots of the projecting tubes, and a locking member inserted between said projections and having a flat head engaging within the transverse slots in said tubes.

References Cited in the file of this patent

UNITED STATES PATENTS

| | | |
|---|---|---|
| 578,011 | Girardet | Mar. 2, 1897 |
| 1,394,866 | Schoenknecht | Oct. 25, 1921 |
| 2,211,164 | Rippenbein | Aug. 13, 1940 |
| 2,440,091 | Hoyt | Apr. 20, 1948 |
| 2,445,058 | Fields | July 13, 1948 |
| 2,483,341 | Haas | Sept. 27, 1949 |
| 2,511,160 | Grobowski | June 13, 1950 |
| 2,705,156 | Torre | Mar. 29, 1955 |